US010841152B1

(12) United States Patent
Humphreys

(10) Patent No.: US 10,841,152 B1
(45) Date of Patent: Nov. 17, 2020

(54) ON-DEMAND CLUSTER CREATION AND MANAGEMENT

(71) Applicant: Pivotal Software, Inc., San Francisco, CA (US)

(72) Inventor: Colin Michael Humphreys, London (GB)

(73) Assignee: Pivotal Software, Inc., San Francisco, CA (US)

( * ) Notice: Subject to any disclaimer, the term of this patent is extended or adjusted under 35 U.S.C. 154(b) by 45 days.

(21) Appl. No.: 16/207,689

(22) Filed: Dec. 3, 2018

Related U.S. Application Data

(60) Provisional application No. 62/607,287, filed on Dec. 18, 2017.

(51) Int. Cl.
| | |
|---|---|
| *G06F 15/173* | (2006.01) |
| *H04L 12/24* | (2006.01) |
| *G06F 9/455* | (2018.01) |
| *H04L 29/08* | (2006.01) |

(52) U.S. Cl.
CPC ...... *H04L 41/0806* (2013.01); *G06F 9/45558* (2013.01); *H04L 67/10* (2013.01); *G06F 2009/45595* (2013.01); *H04L 41/20* (2013.01)

(58) Field of Classification Search
CPC ..... H04L 41/0806; H04L 41/20; H04L 67/10; G06F 9/45558; G06F 2009/45595
USPC ........................................................ 709/223
See application file for complete search history.

(56) References Cited

U.S. PATENT DOCUMENTS

2015/0264122 A1* 9/2015 Shau ...................... H04L 67/10
709/203

* cited by examiner

*Primary Examiner* — Wing F Chan
*Assistant Examiner* — Joseph R Maniwang
(74) *Attorney, Agent, or Firm* — Fish & Richardson P.C.

(57) ABSTRACT

Methods, systems, and apparatus, including computer programs encoded on computer storage media for creating and configuring computing clusters on a cloud computing platform. One of the methods includes receiving, by a service broker, a user input requesting creation of a computing cluster. The service broker generates, based at least in part on one or more release templates and the user input, a deployment manifest that specifies components and properties of a deployment of one or more clusters of a container orchestrator. The service broker provides the deployment manifest to a deployment manager. The deployment manager creates, according to the deployment manifest, one or more computing clusters in which one or more containerized applications are managed by the container orchestrator. Each computing cluster is configured to execute, in a user space, a containerized application specified by the container orchestrator. References to the computing cluster(s) are provided to a user device.

20 Claims, 4 Drawing Sheets

ON-DEMAND CLUSTER CREATION AND MANAGEMENT

CROSS REFERENCE TO RELATED APPLICATIONS

This application claims the benefit under 35 U.S.C. § 119(e) of the filing date of U.S. Patent Application No. 62/607,287, filed Dec. 18, 2017, entitled "ON-DEMAND CLUSTER CREATION AND MANAGEMENT," the entire contents of which are hereby incorporated by reference.

BACKGROUND

This specification generally relates to cloud computing techniques.

In cloud computing, a set of shared computing resources, storage resources, and network resources can be provisioned to users, generally in the form of computing clusters including one or more virtual machines. Multiple physical computing appliances, e.g., computers in a server farm, can provide a service platform for provisioning these resources. The service platform is sometimes referred to as infrastructure as a service (IaaS). A deployment system can automate and simplify transforming a source code or binary code representation of an application into a service instance of that application using IaaS resources. The service instance can then be accessed by end users on a cloud computing platform. An example of a cloud computing platform is a Pivotal Cloud Foundry® software product deployed on a set of cloud appliances. An example deployment system is a BOSH system that deploys and manages service instances on a cloud computing platform.

Container orchestrators can be used to manage containers in the clusters and containerized applications executing in the containers. Setting up the container orchestrator for a particular cloud computing platform requires very labor intensive manual configurations that are based on the desired configuration of the cluster and the properties of the cloud computing platform. In addition, the configurations are not portable to the other cloud computing platform, which means that users would have to perform the labor intensive manual process to execute the same application in a cluster on a different cloud computing platform.

SUMMARY

This specification describes methods, systems, and computer-readable media for creating and configuring computing clusters on a cloud computing platform. A service broker receives a user input requesting creating of a computing cluster. The service broker generates, based at least in part on one or more release templates and the user input, a deployment manifest that specifies components and properties of a deployment of one or more clusters of a container orchestrator. The service broker provides the deployment manifest to a deployment manager. The deployment manager creates, according to the deployment manifest, one or more computing clusters managed by the container orchestrator. The one or more computing clusters include a user space in the one or more computing clusters. Each computing cluster is configured to execute, in the user space, one or more containerized applications specified by the container orchestrator. References to the one or more computing clusters are provided to a user device as a response to the user input.

Particular embodiments of the subject matter described in this specification can be implemented to realize one or more of the following advantages. The disclosed techniques can lower development complexity and increase operational efficiency, especially when users have diverse workloads. The disclosed techniques can provide a reliable and smooth experience for any cloud platform. The disclosed techniques can allow platform operations from different toolsets and the creation of continuous deployment (CD) pipelines. The disclosed techniques can provide a consistent setup experience across different cloud environment configurations, e.g., without the user being required to customize any configurations based on the cloud environment that will be used to host the computing clusters. Compared to conventional deployment techniques, the disclosed techniques can reduce the time for setting up a working environment of computing clusters from weeks to hours or even less time. The disclosed techniques also allow users to quickly and efficiently initiate fully functioning computing clusters with a single command, e.g., using a command line interface. The disclosed techniques also allow users to initiate particular types of clusters, e.g., Kubernetes clusters, on various different computing platforms, e.g., provided by different cloud providers, with a same command and same interface. Thus, the techniques provide a consistent setup experience across different cloud environment configurations.

The disclosed techniques can also generate a deployment manifest based on a release template and optionally the cloud computing platform that is used by the deployment manager to create the computing clusters. Generating the deployment manifest further reduces the time for setting up the working environment and makes it easier for users to configure computing clusters for various cloud environment configurations. Updating the deployment manifest in response to updates to the computing cluster, e.g., updates to a container orchestrator that manages the clusters, also reduces the time for updating clusters as users are not required to change any configurations defined by the manifest.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

Figure 1:
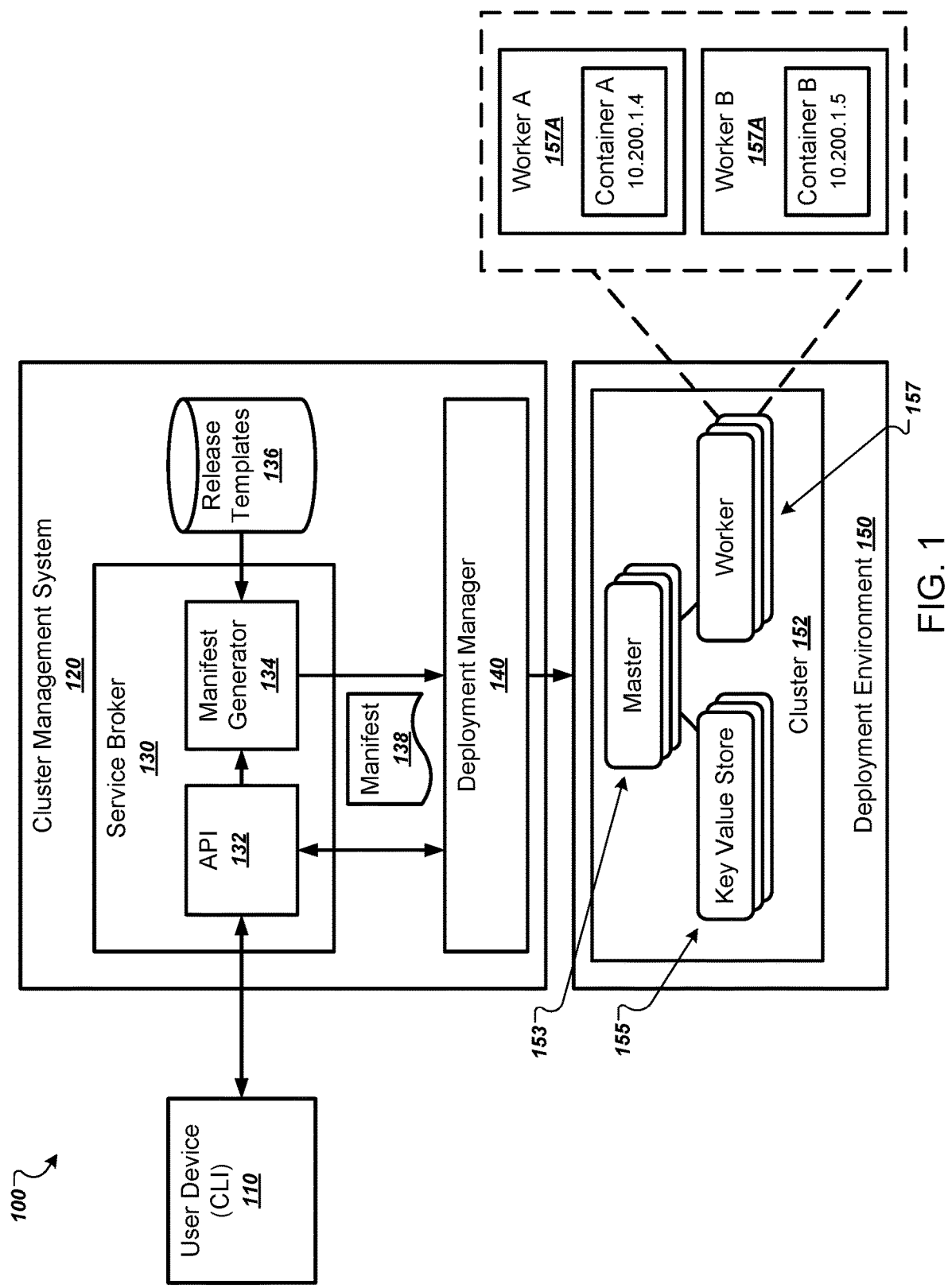
FIG. 1 is a block diagram illustrating an example environment in which a cluster management system creates and manages computing clusters.

FIG. 1 is a block diagram illustrating an example environment 100 in which a cluster management system 120 creates and manages computing clusters. The cluster management system 120 is implemented on one or more computers. In general, the cluster management system 120 facilitates the creation and management of computing clusters of a container orchestrator, e.g., Kubernetes compliant clusters managed by a Kubernetes compliant container orchestrator. Kubernetes is a registered trademark of The Linux Foundation.

The cluster management system 120 can create the clusters in various deployment environments, such as various different cloud computing platforms and/or local deployment platforms, e.g., one or more local on-premises servers, without requiring the user to customize the specifications for the cluster, e.g., without the user being required to modify a release template that specifies jobs, packages, source code, and/or associated metadata for the clusters.

A computing cluster, which may also be referred to herein as a cluster for brevity, can include one or more machines on which applications, e.g., containerized applications, are deployed. The machines can include virtual machines and/or physical machines. Each machine in the cluster can be designated as a node. As described in more detail below, a cluster can include a master node and one or more worker nodes. An example of a cluster is a Kubernetes cluster that can run containerized applications. A containerized application can execute in a container. A container can include a namespace designated to a user on a node.

The cluster management system 120 includes a service broker 130 and a deployment manager 140. In some implementations, the service broker 130 is an on-demand service broker. An on-demand service broker can provision Infrastructure as a Service (IaaS) resources, clusters, and/or other resources at service instance creating time. In general, the service broker 130 allows application developers to provision services, e.g., clusters, to be used by one or more service instances on a cloud computing platform. The service broker 130 can be implemented as one or more computers configured as Hypertext Transfer Protocol (HTTP) servers that conform to a service broker application programming interface (API) 132. The API 132 allows applications to view and select resources of a cloud computing platform on which the cluster management system 120 manages clusters. The API 132 also receives and processes commands related to clusters received from a user device 110.

The user device 110 is an electronic device, e.g., a computer, that provides one or more interfaces to an application developer. The interface can be a command-line interface (CLI), graphical user interface (GUI), or a combination of the two. The user device 110 can use the CLI to issue a request to provision a cluster for deploying a service instance of an application. A service instance is also referred to as a deployment of the application. For example, a user, e.g., an application developer, can enter a command and the name of the cluster or other appropriate cluster identifier in the CLI of the user device 110. An example command is "pks create-cluster cluster name" in which "pks create-cluster" is the command to create the cluster and "cluster name" is the name of the cluster. The user device 110 can then send data specifying the command and the name of the cluster to the service broker 130.

The CLI of the user device 110 can also be used to perform other tasks with respect to clusters managed by the cluster management system 120. For example, the CLI can accept other commands that enable users to view information about clusters, view cluster plans, obtain credentials to deploy workloads to clusters, scale clusters, delete clusters, and/or perform other appropriate tasks related to clusters.

When the service broker 130 receives a command to create a cluster, the service broker 130 can obtain a release template for the cluster based on the name of the cluster. For example, release templates for various clusters can be stored on a release templates data storage device 136 with a reference to the cluster name. The release templates can include the cluster components, e.g., Kubernetes cluster components, the application to be deployed in the cluster, e.g., including jobs, packages, and source code for the application, instructions on how to deploy the application, data specifying a cloud provider on which to deploy the cluster, and/or other appropriate data for the cluster. In some implementations, the release template can also include a user-specified computing platform for the cluster. This allows users to specify the computing platform in the release template. Each release template can be in the form of a TAR archive file, e.g., a TGZ file.

Figure 3:
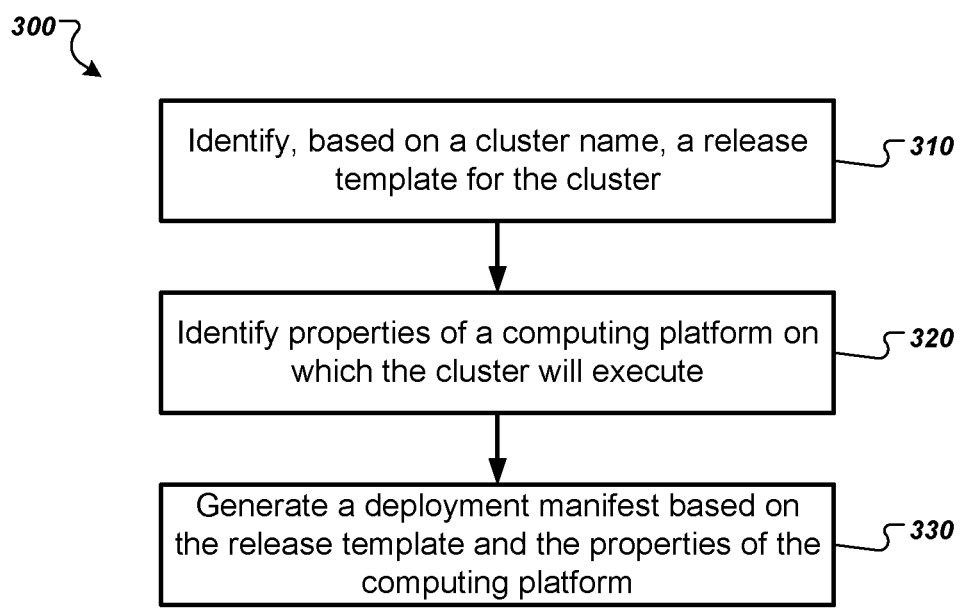
FIG. 3 is a flow chart of an example process for generating a deployment manifest.

A manifest generator 134 of the service broker 130 can generate a deployment manifest 138 for the cluster based on the release template for the cluster and the computing platform on which the cluster will be deployed. The deployment manifest 138 defines the components and properties of the cluster to be deployed. In general, the deployment manifest 138 instructs a deployment manager 140 on how to deploy the cluster. For example, the deployment manifest 138 can define the cloud computing or local platform on which the cluster is to be deployed, the number of instances of each component, e.g., instances of worker nodes, containers, containerized applications, etc., any credentials needed for users to access the clusters, a deployment identifier, e.g., a name for the deployment, release information, e.g., the name and version of each release in the deployment, network configuration, e.g., for a network that enables nodes, containers, and/or clusters to communicate, properties of virtual machines that will be created and managed by the deployment manager 140, properties of disk pools that will be created and managed by the deployment manager 140, update information that defines how the deployment manager 140 updates job instances during deployment, jobs information that defines the configuration and resource information for jobs, and/or other appropriate information. The deployment manifest 138 can be in the form of a text document, e.g., a YAML file. An example process for generating a deployment manifest is illustrated in FIG. 3 and described below.

The deployment manager 140 creates, configures, and manages one or more clusters 152 in a deployment environment 150 based on the deployment manifest 138.

The deployment environment 150 can be a cloud computing platform and/or a local deployment platform, e.g., one or more on-premises physical servers. Example cloud-computing platforms include VMWare Cloud Foundation, Google Cloud Platform (GCP) and Amazon Web Services (AWS) cloud. The deployment manager 140 can create and configure the cluster(s) 152 on the platform defined by the deployment manifest 138.

Creating the cluster(s) 152 can include creating a number of clusters and instances of components in each cluster 152 based on the properties of the clusters defined by the deployment manifest 138. Configuring the cluster(s) 152 can include configuring the clusters for the deployment environment 150, which may include different configurations for different deployment environments. The deployment manifest 138 can include data that instructs the deployment manager 140 on how to configured the cluster(s) 152 for the specified deployment environment 150. Creating the cluster(s) 152 can also include designating one or more physical or virtual machines of a cloud provider as components of the cluster(s) 152.

The deployment manager 140 can create, configure, and manage a particular type of clusters that include a particular container orchestrator that managers containerized applications executing in the clusters. In some implementations, the deployment manager 140 is a BOSH-compliant tool implemented on one or more computers. BOSH provides a tool chain for packaging, deploying, and managing cloud software. In some implementations, the cluster 152 is a Kubernetes cluster. In this example, a BOSH-compliant deployment manager can deploy and manage Kubernetes clusters on various cloud computing platforms using a deployment manifest 138. Although the examples described below are described largely in terms of Kubernetes clusters, similar techniques can be used to deploy and manage other types of clusters.

Regardless of the cloud computing platform selected, the user can initiate the creation, configuration, and management of the clusters, e.g., Kubernetes clusters, using the same CLI command at a CLI of the user device 110. The service broker 130 and the deployment manager 140 of the cluster management system 120 can create, configure, and manage the clusters for the user, e.g., without requiring any additional information from the user. Thus, the cluster management system 120 enables quick and efficient creation of clusters on various cloud computing and local platforms that would not be possible absent the unconventional techniques described herein.

The cluster management system 120 also enables users to deploy clusters, e.g., Kubernetes clusters, on various different computing platforms without requiring the user to reconfigure the release template, the containerized application, or modifying any other parameters of the deployment outside of specifying the computing platform. The service broker 130 and deployment manager 140 handles all of the changes required for the different computing platforms.

To create a Kubernetes cluster in the deployment environment 150, the deployment manager 140 can create a cluster 152 that includes one or more virtual machines in the deployment environment 150. For example, the deployment manager 140 can initiate the virtual machines and designate them for use as the cluster 152. The deployment manager 140 can install the Kubernetes software on the virtual machines. The deployment manager 140 can then instruct the Kubernetes software to create the containers specified by the deployment manifest 138 and manage the execution of containerized applications in the containers. In response, the Kubernetes software can create the containers, install the containerized applications in the containers, and manage the execution of containerized applications in the containers.

The Kubernetes software can also configure the containers, e.g., configure the security settings and configure communications between the containers. For example, as described below, the Kubernetes software can generate and configure a virtual network for the containers and nodes of the cluster 152 based on the deployment manifest 138.

A Kubernetes cluster includes a cluster master 153, a key value store 155, and one or more worker nodes 157. In this example, the cluster 152 includes two worker nodes 157A and 157B. The cluster master 153 can run a Kubernetes API Server process that acts as the hub for all communication for the cluster 152. The cluster master 153 is also a container orchestrator that manages the execution of containerized applications in the cluster 150. As part of the container orchestration, the cluster master 153 can determine what runs on each of the worker nodes 157. For example, the cluster master 153 can schedule workloads, e.g., containerized applications, manage network and storage resources for the workloads, scale workloads, e.g., automatically or in response to user requests, restart containers that fail, replace and reschedule containers when they fail, balance loads between worker nodes 157, and/or perform other appropriate tasks.

The worker nodes 157 are or includes machines, e.g., virtual machines that run containerized applications and other workloads. For example, the worker node 157A runs a containerized application in container A and the worker node 157B runs a containerized application in container B. Each worker node 157 is managed by the cluster master 153.

The key value store 155, which is also a node, stores and provides access to data of the cluster 152. For example, the key value store 155 can preserve and provide access to critical data. The key value store can act as a backup storage location of the cluster data. The key value store 155 can be configured to store the cluster data as one or more persistent data objects.

The cluster 152 can also include one or more health monitoring applications. For example, one of the containerized applications in container A or container B can be a health monitoring application that is configured to monitor the health of the cluster 152. The health monitoring application can provide data related to the health to the cluster master 153. The cluster master 153 can monitor the health of the cluster 152 based on this data and adjust the containers or containerized applications, e.g., balance workloads, create new containers, or restart containers or containerized applications, based on the health of the cluster. The cluster master 153 can also provide this data to the deployment manager 140.

The configuration parameters of the health monitoring application can be specified in a policy associated with the user request for creating the cluster 152, e.g., associated with the cluster name, or associated with the release template cluster name. The containers can also be installed on the cluster 152 according to a customized policy specific to the user that requested creating the cluster 152.

The cluster master 153 monitors the health of the components, e.g., nodes, containers, and containerized applications, in the cluster 152 and makes adjustments as needed to heal the cluster 152. The deployment manager 140 can also monitor the health of the cluster 152, e.g., based on data received from the cluster master 153. The deployment manager 140 can scale the number of cluster masters 153, key value stores 155, and/or clusters 152 based on the health or workload of the cluster 152. For example, the deployment manager 140 can spin up another cluster master 153 virtual machine in response to an increase in demand for the containerized applications.

The deployment manager 140 can create communication networks for the one or more clusters. The communication networks can support intra-cluster and inter-cluster communication. The deployment manager 140 can provide the one or more computing clusters to the user, e.g., in the form of names of the clusters and network addresses for accessing the clusters. The deployment manager 140 can assign each node a respective network address. For example, the deployment manager 140 can assign the cluster master 153 a first network address, the key value store 155 a second network address, and each worker node a respective third network address that is different for each node. The deployment manager 140 can also configure a virtual network router for each cluster 152. The virtual network router can communicate data within the cluster 152 and with other clusters (not shown).

The communication networks can also support inter-container communication.

For example, the container A and the container B of the cluster 152 have respective network addresses. The deployment manager 140 can enable users to access the containerized application executing in the containers using the network addresses.

Figure 2:
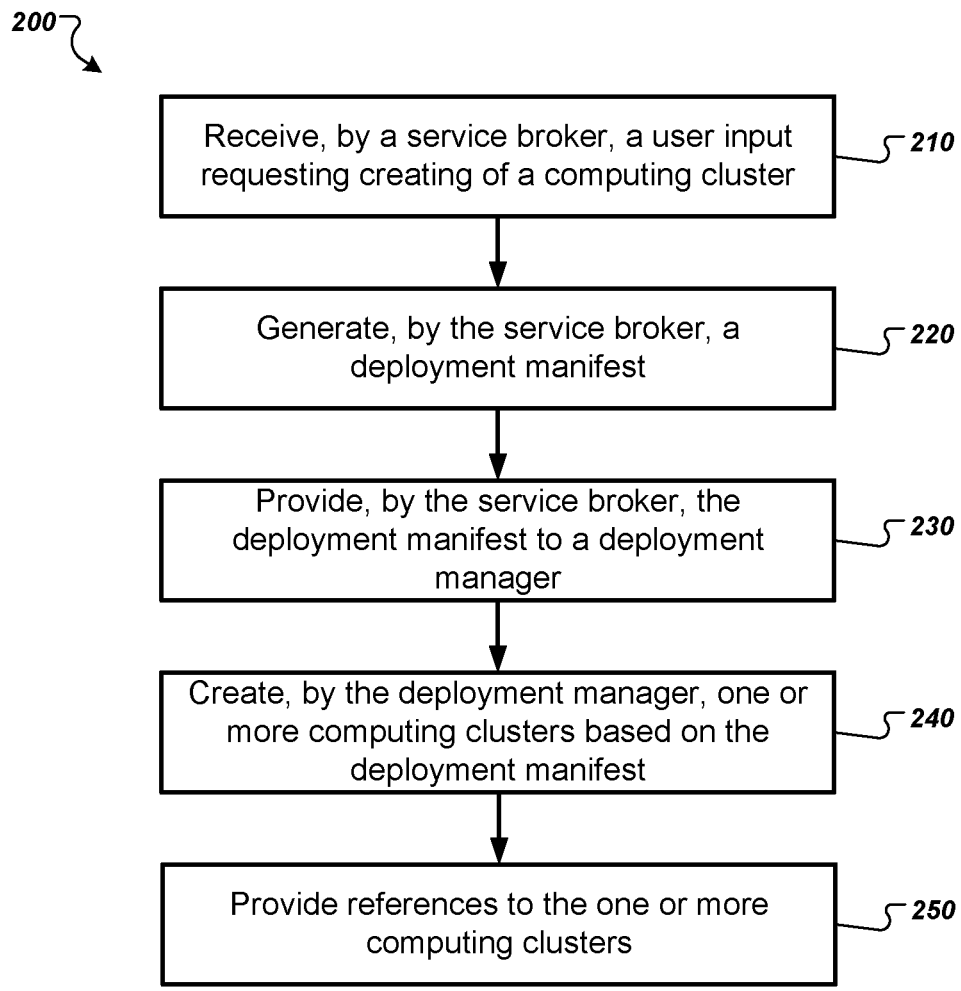
FIG. 2 is a flow chart of an example process for creating computing clusters.

FIG. 2 is a flow chart of an example process 200 for creating computing clusters. For convenience, the process 200 will be described as being performed by a system of one or more computers, located in one or more locations, and programmed appropriately in accordance with this specification. For example, the process 200 can be performed by a cluster management system, e.g., the cluster management system 100 of FIG. 1.

A service broker receives a user input requesting creating a computing cluster (210). For example, an on-demand service broker can receive a request to create a computing cluster from a CLI of a user device. A user can enter, into the CLI, a command and a name of the cluster that the user is requesting to be created. The CLI can send the command and the name of the cluster to the on-demand service broker, e.g., to an API of the on-demand service broker.

The service broker creates a deployment manifest (220). As described above, the service broker can generate the deployment manifest based on a release template for the cluster and a cloud computing platform on which the cluster will be deployed. The deployment manifest defines the components and properties of the cluster to be deployed. In general, the deployment manifest instructs a deployment manager on how to deploy the cluster. The deployment manager that will create the clusters can be tied to a particular cloud computing platform. The service broker can generate the deployment manifest based on the particular cloud computing platform.

The service broker provides the deployment manifest to a deployment manager (230). The deployment manager can be a BOSH-compliant tool that creates, configures, and managers computing clusters based on deployment manifests. For example, the deployment manager can include a BOSH director that is configured to create, configure, and manage Kubernetes clusters based on the deployment manifests.

The deployment manager creates one or more computing clusters based on the deployment manifest (240). As described above, creating the cluster(s) can include creating a number of clusters and instances of components in each cluster based on the properties of the clusters defined by the deployment manifest. The deployment manager can also configure the cluster(s) for the deployment environment, which may include different configuration for different deployment environments.

The deployment manager can also deploy a container orchestrator in the cluster(s). For example, the cluster(s) can include one or more virtual machines. The deployment manager can deploy a container orchestrator in the virtual machine(s). In some implementations, the container orchestrator is Kubernetes software that manages the execution of containerized applications in containers deployed in the cluster(s). The deployment manager can instruct the container orchestrator to create the containers and execute the containerized application(s) in the containers, e.g., based on the deployment manifest specifying the containers and the containerized application(s).

References to the one or more computing clusters are provided to a user device in response to the user input (250). For example, the deployment manager can provide, to the user device, the name of the cluster(s) and network addresses for accessing the clusters and/or the containers in the cluster(s). The service broker and the deployment manager can also provide access to the clusters via a CLI. For example, the user can submit requests for information about the clusters and/or requests to change the clusters, e.g., scale up or down the containerized application, using the CLI. The service broker can provide the requests to the deployment manager. The deployment manager can obtain the requested information and provide it to the service broker for presentation at the CLI. If the request is to modify a cluster, the deployment manager can interact with the container orchestrator to modify the cluster according to the request without further user input.

FIG. 3 is a flow chart of an example process 300 for generating a deployment manifest. For convenience, the process 300 will be described as being performed by a system of one or more computers, located in one or more locations, and programmed appropriately in accordance with this specification. For example, the process 300 can be performed by a cluster management system, e.g., the cluster management system 100 of FIG. 1.

A release template is identified for a cluster based on a cluster name (310). As described above, a service broker can receive a request to create a cluster and the request can specify the cluster name. Each cluster name can be associated with a release template that includes the cluster components, e.g., Kubernetes cluster components, the application to be deployed in the cluster, e.g., including jobs, packages, and source code for the application, instructions on how to deploy the application, data specifying a cloud provider on which to deploy the cluster, and/or other appropriate data for the cluster. The release template can be generated by a user, e.g., an application developer.

Properties of the computing platform on which the cluster will execute are identified (320). As described above, the deployment manager can create, configure, and manage clusters on various different cloud computing platforms and local computing platforms. A user can specify which computing platform on which the cluster(s) identified by the cluster name will be deployed. In another example, the deployment manager can be tied to a particular computing platform. In some implementations, data specifying the computing platform is stored in the release template.

A deployment manifest is generated based on the release template and the properties of the computing platform (330). The deployment manifest defines the components and properties of the cluster to be deployed. To generate the deployment manifest, a service broker can merge details of the deployment with a release template for the cluster. For example, the service broker can determine, based on the computing platform for the cluster and/or the data specified by the release template, specific network details for a virtual network of the cluster that will be implemented on the computing platform. These details can include the type of network that can be created on the computing platform, the type of network components that can be used in the network, and the number of network components required for the cluster. The service broker can also determine, based on the computing platform and/or the data specified by the release template, data storage of the computing platform that will be used to store data for the container(s) of the cluster, e.g., the type of data storage, the amount of data storage available, and/or the amount of data storage required by the cluster, virtual machine types of the computing platform that will be used to host the cluster, and/or other appropriate implementation details of the cluster on the computing platform. The service broker can merge these details with the release template to generate the deployment manifest.

The service broker can also include any user-specified values or parameters in the deployment manifest. For example, the service broker can include, in the deployment manifest, a number of containers to be deployed in the cluster, the name of the cluster, and/or other user-specified values or parameters.

Figure 4:
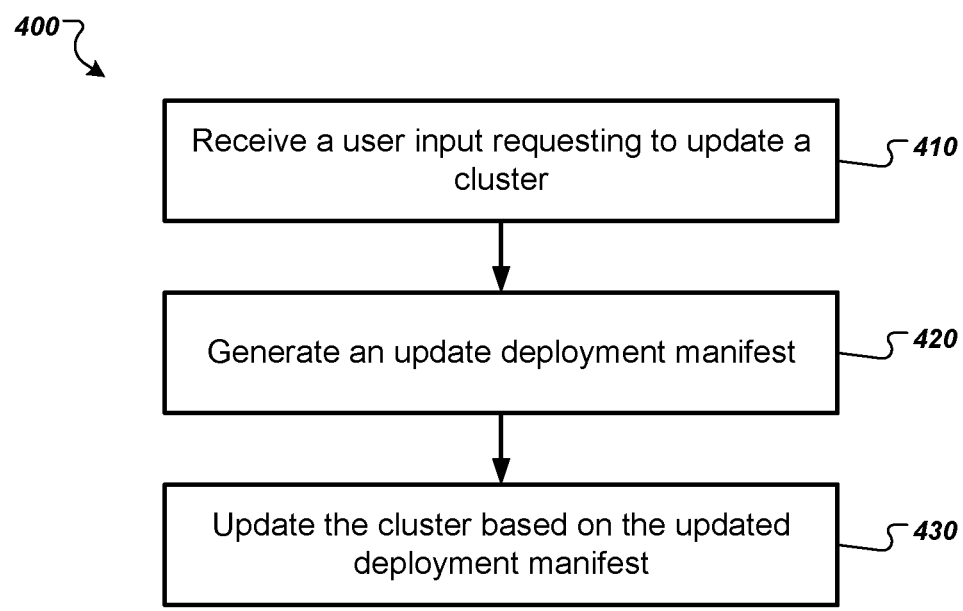
FIG. 4 is a flow chart of an example process for updating a computing cluster.

FIG. 4 is a flow chart of an example process 400 for updating a computing cluster. For convenience, the process 400 will be described as being performed by a system of one or more computers, located in one or more locations, and programmed appropriately in accordance with this specification. For example, the process 400 can be performed by a cluster management system, e.g., the cluster management system 100 of FIG. 1.

A user input requesting to update a cluster is received (410). A service broker can received the request from a CLI. The request can be to update the version of the container orchestrator deployed in the cluster, to update the version of the deployment manager, or to update the containerized application running in the containers of the cluster.

An updated deployment manifest is generated based on the request (420). For example, a manifest generator can obtain the deployment manifest for the cluster and update the deployment manifest based on the requested update. If the requested update is to update to a different version of the container orchestrator, the manifest generator can update the deployment manifest to instruct the deployment manager to deploy the new version of the container orchestrator on the cluster. The manifest generator can also update the deployment manifest based on any other properties specified by the deployment manager that should be updated based on capabilities of the updated version of the container orchestrator.

For example, if the updated version of the container orchestrator requires additional memory, the manifest generator can update the deployment manifest to instruct the deployment manager to procure the additional memory for the cluster. In another example, if the updated version of the container orchestrator has different functionality, the manifest generator can update the deployment manifest to instruct the deployment manager to create a cluster that supports the different functionality.

The cluster is updated based on the updated deployment manifest (430). For example, the deployment manager can update the cluster based on the updated deployment manifest. If the deployment manifest was updated to update the version of the container orchestrator or the containerized application, the deployment manager can update the container orchestrator or containerized application in the cluster. For example, the deployment manager can install updates to the applications to update the applications to the updated version.

The deployment manager can also reconfigure the cluster based on any changes in the updated deployment manifest relative to the previous deployment manifest. For example, if the updated deployment manifest requires more memory resources, the deployment manager can procure additional memory for the cluster.

This process of updating a cluster enables a user to update a cluster with a single command, e.g., a single commend entered into a CLI. The service broker can update the deployment manifest based on the single command the deployment manager can update the cluster based on the single command.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments described above, the following embodiments are also innovative:

Embodiment 1 is a method comprising:
receiving, by a service broker, a user input requesting creation of a computing cluster;
generating, by the service broker and based at least in part on one or more release templates and the user input, a deployment manifest that specifies components and properties of a deployment of one or more clusters of a container orchestrator;
providing, by the service broker, the deployment manifest to a deployment manager;
creating, by the deployment manager according to the deployment manifest, one or more computing clusters in which one or more containerized applications are managed by the container orchestrator, the one or more computing clusters including a user space in the one or more computing clusters, each computing cluster configured to execute, in the user space, at least one containerized application specified by the container orchestrator; and
providing references to the one or more computing clusters to a user device as a response to the user input.

Embodiment 2 is the method of embodiment 1, wherein:
the container orchestrator is a Kubernetes-compliant tool implemented on one or more computers; and
the deployment manager is a BOSH compliant tool implemented on one or more computers.

Embodiment 3 is the method of embodiment 1, wherein creating the one or more computing clusters comprises designating one or more physical or virtual machines of a cloud provider as components of the one or more computing clusters.

Embodiment 4 is the method of embodiment 1, wherein:
each computing cluster includes a master node, one or more worker nodes, and a key value store.

Embodiment 5 is the method of embodiment 4, wherein:
each node of the master node and one or more worker nodes includes a respective virtual or physical machine configured to execute the one or more containerized applications; and
the key value store is configured to store one or more persistent data objects.

Embodiment 6 is the method of embodiment 4, wherein the operations comprise creating, by the deployment manager according to the deployment manifest, a respective communications network for each computing cluster.

Embodiment 7 is the method of embodiment 6, wherein creating the respective communications network for each computing cluster comprises:
assigning a respective network address to each master node, each worker node, and each key value store; and
designating a respective virtual network router for each computing cluster.

Embodiment 8 is the method of embodiment 1, wherein creating the one or more computing clusters occurs at an on premise computer network.

Embodiment 9 is the method of embodiment 1, wherein the operations comprise populating each computing cluster with the one or more containerized applications.

Embodiment 10 is the method of embodiment 9, wherein the one or more containerized applications include at least one monitoring application configured to monitor health of a computing cluster, configuration parameters of the monitoring application being specified in a policy associated with the user input or associated with the one or more release templates.

Embodiment 11 is the method of embodiment 9, wherein populating the one or more computing clusters includes installing containers of the application on each of the one or more computing clusters according to a customized policy specific to the user.

Embodiment 12 is the method of embodiment 1, wherein creating the one or more computing clusters comprises:
- initializing a virtual machine for hosting the one or more computing clusters; and
- installing software of the container orchestrator on the virtual machine.

Embodiment 13 is the method of embodiment 1, wherein:
- receiving the user input requesting creating of a computing cluster comprising receiving a command specifying a name of the one or more clusters from a command line interface of the service provider; and
- generating the deployment manifest comprises determining, by the service provider, the components and properties of the one or more clusters using a particular release template corresponding to the name.

Embodiment 14 is a system comprising: a plurality of computers and one or more storage devices storing instructions that are operable, when executed by the one or more computers, to cause the one or more computers to perform the method of any one of embodiments 1-13.

Embodiment 15 is a computer storage medium encoded with a computer program, the program comprising instructions that are operable, when executed by a plurality of computers, to cause the plurality of computers to perform the method of any one of embodiments 1-13.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A distributed computing system comprising a plurality of computers and one or more storage devices storing instructions that are operable, when executed by the plurality of computers, to cause the plurality of computers to perform operations comprising:
   - receiving, by a service broker, a user input requesting creation of a computing cluster;
   - generating, by the service broker and based at least in part on one or more release templates and the user input, a deployment manifest that specifies components and properties of a deployment of one or more clusters of a container orchestrator;
   - providing, by the service broker, the deployment manifest to a deployment manager;
   - creating, by the deployment manager according to the deployment manifest, one or more computing clusters in which one or more containerized applications are managed by the container orchestrator, the one or more computing clusters including a user space in the one or more computing clusters, each computing cluster configured to execute, in the user space, at least one containerized application specified by the container orchestrator; and
   - providing references to the one or more computing clusters to a user device as a response to the user input.

2. The system of claim 1, wherein creating the one or more computing clusters comprises designating one or more physical or virtual machines of a cloud provider as components of the one or more computing clusters.

3. The system of claim 1, wherein:
   - each computing cluster includes a master node, one or more worker nodes, and a key value store.

4. The system of claim 3, wherein:
   - each node of the master node and one or more worker nodes includes a respective virtual or physical machine configured to execute the one or more containerized applications; and
   - the key value store is configured to store one or more persistent data objects.

5. The system of claim 3, wherein the operations comprise creating, by the deployment manager according to the deployment manifest, a respective communications network for each computing cluster.

6. The system of claim 5, wherein creating the respective communications network for each computing cluster comprises:
   - assigning a respective network address to each master node, each worker node, and each key value store; and
   - designating a respective virtual network router for each computing cluster.

7. The system of claim 1, wherein creating the one or more computing clusters occurs at an on premise computer network.

8. The system of claim 1, wherein the operations comprise populating each computing cluster with the one or more containerized applications.

9. The system of claim 8, wherein the one or more containerized applications include at least one monitoring application configured to monitor health of a computing cluster, configuration parameters of the monitoring application being specified in a policy associated with the user input or associated with the one or more release templates.

10. The system of claim 8, wherein populating the one or more computing clusters includes installing containers of the one or more containerized applications on each of the one or more computing clusters according to a customized policy specific to a user that provided the user input.

11. The system of claim 1, wherein creating the one or more computing clusters comprises:
   initializing a virtual machine for hosting the one or more computing clusters; and
   installing software of the container orchestrator on the virtual machine.

12. The system of claim 1, wherein:
   receiving the user input requesting creating of a computing cluster comprising receiving a command specifying a name of the one or more clusters from a command line interface of the service broker; and
   generating the deployment manifest comprises determining, by the service broker, the components and properties of the deployment of the one or more clusters using a particular release template corresponding to the name.

13. A method performed by a distributed computing system comprising a plurality of computers, the method comprising:
   receiving, by a service broker, a user input requesting creation of a computing cluster;
   generating, by the service broker and based at least in part on one or more release templates and the user input, a deployment manifest that specifies components and properties of a deployment of one or more clusters of a container orchestrator;
   providing, by the service broker, the deployment manifest to a deployment manager;
   creating, by the deployment manager according to the deployment manifest, one or more computing clusters in which one or more containerized applications are managed by the container orchestrator, the one or more computing clusters including a user space in the one or more computing clusters, each computing cluster configured to execute, in the user space, at least one containerized application specified by the container orchestrator; and
   providing references to the one or more computing clusters to a user device as a response to the user input.

14. The method of claim 13, wherein creating the one or more computing clusters comprises designating one or more physical or virtual machines of a cloud provider as components of the one or more computing clusters.

15. The method of claim 13, wherein:
   each computing cluster includes a master node, one or more worker nodes, and a key-value store.

16. The method of claim 15, wherein:
   each node of the master node and one or more worker nodes includes a respective virtual or physical machine configured to execute the one or more containerized applications; and
   the key-value store is configured to store one or more persistent data objects.

17. The method of claim 15, comprising creating, by the deployment manager according to the deployment manifest, a respective communications network for each computing cluster.

18. One or more non-transitory computer storage media encoded with computer program instructions that when executed by a distributed system comprising a plurality of computers cause the plurality of computers to perform operations comprising:
   receiving, by a service broker, a user input requesting creation of a computing cluster;
   generating, by the service broker and based at least in part on one or more release templates and the user input, a deployment manifest that specifies components and properties of a deployment of one or more clusters of a container orchestrator;
   providing, by the service broker, the deployment manifest to a deployment manager;
   creating, by the deployment manager according to the deployment manifest, one or more computing clusters in which one or more containerized applications are managed by the container orchestrator, the one or more computing clusters including a user space in the one or more computing clusters, each computing cluster configured to execute, in the user space, at least one containerized application specified by the container orchestrator; and
   providing references to the one or more computing clusters to a user device as a response to the user input.

19. The non-transitory computer storage media of claim 18, wherein creating the one or more computing clusters comprises designating one or more physical or virtual machines of a cloud provider as components of the one or more computing clusters.

20. The non-transitory computer storage media of claim 18, wherein:
   each computing cluster includes a master node, one or more worker nodes, and a key value store.

* * * * *